United States Patent
Enomoto et al.

(10) Patent No.: US 6,816,620 B2
(45) Date of Patent: Nov. 9, 2004

(54) METHOD OF PRESERVING PHOTOGRAPHED IMAGES IN ACCORDANCE WITH THE DATE OF PHOTOGRAPHING

(75) Inventors: Hiromichi Enomoto, Hachioji (JP); Toyoaki Sugaya, Hachioji (JP); Masataka Nakano, Hachioji (JP)

(73) Assignee: Konica Corporation (JP)

( * ) Notice: Subject to any disclaimer, the term of this patent is extended or adjusted under 35 U.S.C. 154(b) by 604 days.

(21) Appl. No.: 09/861,970

(22) Filed: May 21, 2001

(65) Prior Publication Data

US 2001/0055126 A1 Dec. 27, 2001

(30) Foreign Application Priority Data

May 19, 2000 (JP) ......................................... 2000-148532

(51) Int. Cl.[7] .............................. G06T 5/00; G06K 9/00
(52) U.S. Cl. ........................................ 382/254; 382/167
(58) Field of Search ................................. 382/254, 167; 358/1.17, 403

(56) References Cited

U.S. PATENT DOCUMENTS

| | | | | |
|---|---|---|---|---|
| 5,229,585 A | * | 7/1993 | Lemberger et al. | 235/375 |
| 5,274,418 A | * | 12/1993 | Kazami et al. | 355/40 |
| 5,767,947 A | * | 6/1998 | Schindler et al. | 355/40 |
| 6,215,564 B1 | * | 4/2001 | Okino | 358/501 |
| 6,249,362 B1 | * | 6/2001 | Sato et al. | 358/527 |
| 6,275,656 B1 | * | 8/2001 | Cipolla et al. | 396/6 |
| 6,415,108 B1 | * | 7/2002 | Kamishima et al. | 396/312 |

* cited by examiner

Primary Examiner—Leo Boudreau
Assistant Examiner—Patrick Edwards
(74) Attorney, Agent, or Firm—Cantor Colburn LLP

(57) ABSTRACT

An image data preservation method wherein, when converting imaged in which date information is photographed into image data, information about the date is read and preserved to be correlated with the image data, as additional information.

6 Claims, 6 Drawing Sheets

METHOD OF PRESERVING PHOTOGRAPHED IMAGES IN ACCORDANCE WITH THE DATE OF PHOTOGRAPHING

BACKGROUND OF THE INVENTION

The present invention relates to an image data storage method wherein an image is read from a silver halide film in which an image is captured through exposure and is converted into image data to be stored, and to an image processing method wherein image processing can be conducted on images in accordance with a date of photographing.

In addition to a conventional service to make a print from an image in a silver halide negative film that is brought in by a customer, there has been devised, in the field of photofinishing laboratories, a new service wherein various facilities such as a scanner, a printer and a server computer having large capacity (hereinafter referred to as an image server) are installed, and photographs obtained through photographing by a customer are converted into image data and then are stored in a storage medium such as CD and DVD, or images are printed to be offered. The image data of this type can be preserved as an electronic album that is original and peculiar to each customer.

Incidentally, the image data have an advantage that image reproduction can be carried out while keeping the initial image quality. However, there is a problem that it takes much time to read out specific data when a file name is unknown, because image data themselves are invisible.

For the situation stated above, there has been devised a retrieval method wherein, when educing specific image data from a vast amount of image data, retrieval is conducted based on the content feature such as information about a date stored corresponding to the image data mentioned above. The retrieval method of this kind makes it possible to detect specific image data efficiently, even when the file name of the image data is unknown.

However, one of the problems in practice of the retrieval method is who inputs content feature correlated with image data and which step the content feature are inputted. For example, since data such as a date of photographing and others are recorded simultaneously with photographing of a subject in the case of a digital still camera, these data can be used as content feature.

In a camera of a silver halide type, however, information such as a date or the like cannot be recorded in the case of the so-called 135 type camera which is firmly popular, although information of a date or the like can be recorded as magnetic information on a part of a silver halide negative film in the case of a camera that complies with an APS film. Therefore, when digitizing images in a negative film captured through exposure by a 135 type camera, an operator needs to input information of a date each time by correlating it with image data, which is time-consuming. In addition, when there is an inputting error, the image data are buried in a vast amount of image data, resulting in a fear that the image data are not found out again.

Further, since an image is formed through chemical reactions in the case of a silver halide film, there is a potential of deterioration of image quality such as color fading to a certain extent, if the image is preserved for a long time. If the image in a silver halide film preserved for a long time is digitized as it is, image data are preserved under the state of deteriorated image quality, which is not preferable.

Though image data can be subjected to correction processing, on the other hand, a ground based on which the correction is conducted is unclear. Namely, correction processing cannot be conducted unless the extent of a change in image color is grasped.

On the other hand, among some photograph lovers, color-faded photographs are sometimes loved. For example, when silver halide photographs are preserved for a long time, colors of images are totally changed to sepia color, and this sepia color gives a rise to a nostalgic atmosphere of a peculiar sort. However, image data are hardly changed in terms of quality even when they are preserved for a long time and therefore, their image quality is kept to the initial state. Therefore, it is considered that images need to be faded in color naturally, like silver halide photographs.

SUMMARY OF THE INVENTION

An object of the invention is to provide an image data preservation method wherein date information correlated to image data can be inputted, and an image processing method wherein color fading of a silver halide film can be corrected, and images formed from image data can be subjected to effect processing which is natural and similar to silver halide photographs.

First structure: An image data preservation method wherein, when converting images in which date information is photographed into image data, information about the date is read and preserved to be correlated with the image data, as additional information.

Second structure: An image processing method wherein images on silver halide films or images on silver halide photographs in which a date is photographed are converted into image data, the date is read, and the image data are subjected to image processing to be correlated with the date.

Third structure: An image processing method wherein, when image data are inputted from an electronic image recording apparatus, information about the date added to the image data is read, and the image data are subjected to image processing to be correlated with the date.

In the image data preservation method of the First structure wherein, when converting images in which date information is photographed into image data, information about the date is read and preserved to be correlated with the image data, as additional information, an operator does not need to spend time to input date information each time and an inputting error can be prevented. Incidentally, for converting an image formed through photographing as a date into characters or numerical data, an OCR (optical character reading) function, for example, can be used. The OCR function will not be described in detail here because it is well-known.

Further, it is preferable that information about the date is used as a date of preparation (for example, a date of photographing) of the image data when detecting the image data, because it is less likely that the order of dates is reversed when images are arranged in the order of photographing.

If information about the date is housed in a header of a file containing the image data, retrieval turns out to be easy, which is preferable.

Incidentally, with regard to the image in which information about the date is photographed, images recorded in a silver halide film in which a date is photographed by the use of a date function of a camera, or silver halide photographs are given as an example. However, the invention is not limited to the foregoing, and X-ray images, for example, are also included in the invention.

In this case, when the same silver halide film includes, mixedly, an image wherein a date is not photographed or an image wherein a date is hardly recognized, and an image wherein a date is photographed, the date of the image wherein the date is photographed can be preserved as additional information for the image data corresponding to the image wherein a date is not photographed or the image wherein a date is hardly recognized.

Further, when images in each of which a date is photographed are present before and after an image wherein a date is not photographed or before and after an image wherein a date is hardly recognized, and when the dates are the same in the same silver halide film, the date of the image wherein the date is photographed can be preserved as additional information for the image data corresponding to the image wherein a date is not photographed or the image wherein a date is hardly recognized.

Further, when images in each of which a date is photographed are present before and after an image wherein a date is not photographed or before and after an image wherein a date is hardly recognized, and when the dates are different each other in the same silver halide film, the date or the period of time between the dates for the images in each of which the date is photographed can be preserved as additional information for the image data corresponding to the image wherein a date is not photographed or the image wherein a date is hardly recognized.

Further, when an image in which a date is photographed is present before an image wherein a date is not photographed or an image wherein a date is hardly recognized in the same silver halide film, the date after the date of the image wherein the date is photographed can be preserved as additional information for the image data corresponding to the image wherein a date is not photographed or the image wherein a date is hardly recognized.

Further, when an image in which a date is photographed is present after an image wherein a date is not photographed or an image wherein a date is hardly recognized in the same silver halide film, the date before the date of the image wherein the date is photographed can be preserved as additional information for the image data corresponding to the image wherein a date is not photographed or the image wherein a date is hardly recognized.

Further, when images in each of which a date is not photographed or images in each of which a date is hardly recognized only are present in the same silver halide film, a date of photographing or a period of time is presumed based on symbols or marks described on a cartridge of the silver halide film, and the presumed date of photographing can be preserved as additional information for the image data corresponding to the image wherein a date is not photographed or the image wherein a date is hardly recognized.

Further, when there is present an image wherein a date photographed therein is hardly recognized in the same silver halide film, the date photographed is educed by processing the above-mentioned image and an image photographed before or after the image, and the educed date can be preserved as additional information, for image data corresponding to the image wherein the date photographed therein is hardly recognized.

When the image data are preserved under the condition that the image data are not compressed, the image information is less lost, and images with high image quality can be provided when images are composed.

In the image processing method of the Second structure, an image on a silver halide film in which a date is photographed is converted into image data, the date is read, and the image data are subjected to image processing. Therefore, the image for which the date of photographing is old, for example, is considered to have color fading in accordance with the period for preservation, and the image is subjected to image processing corresponding to the extent of the color fading, thus the initial image quality can be reproduced.

It is further preferable that the image processing is a tone characteristic conversion processing corresponding to the date.

When the statistics of tone characteristics of the image are collected in accordance with the date stated above, and the tone characteristic conversion processing is conducted based on the statistics, the extent of color fading for the preservation period, for example, can be obtained statistically, which is preferable.

It is further preferable that the tone characteristic conversion processing is conducted based on at least one of histogram, cumulative histogram, the mean value, median, a mode, the standard deviation and dispersion, which are all image tone characteristics.

If the tone characteristic conversion processing is conducted for images stored in the same file, so that the tone characteristic may be constant, when the images are arranged in the order of photographing as in the case of an electronic album, for example, the tone is not changed extremely, and a feeling of physical disorder is not given to an observer.

In the image processing method of the Third structure, when image data are inputted from an electronic image recording apparatus, information about the date added to the image data is read, and the image data are subjected to image processing to be correlated with the date. With regard to the image for which the date of photographing is old, for example, therefore, it is possible to express natural color fading as in a photograph of a silver halide type, by conducting image processing so that sepia tone may be obtained corresponding to the time elapsed up to the present time.

If the image processing mentioned above is the tone characteristic conversion processing corresponding to the date stated above, image change corresponding to the time elapsed can be given, and it is possible to express a feeling which is more natural.

If the statistics of a change of tone characteristics of the image on a silver halide film corresponding to the time elapsed are collected and the tone characteristic conversion processing is conducted based on the statistics, it is possible to obtain statistically the extent of color fading of a silver halide photograph for the period, for example, during which the silver halide photograph has been preserved, which is preferable.

It is further preferable that the tone characteristic conversion processing is conducted based on at least one of histogram, cumulative histogram, the mean value, median, a mode, the standard deviation and dispersion, which are all image tone characteristics.

If the tone characteristic conversion processing is conducted for images stored in the same file, so that the tone characteristic may vary in accordance with the date of photographing, it is possible to obtain the image which seems as if it were faded in accordance with the time elapsed, resulting in an album that is close to one for silver halide photographs, which is preferable.

DETAILED DESCRIPTION OF THE PREFERRED EMBODIMENT

Figure 1:
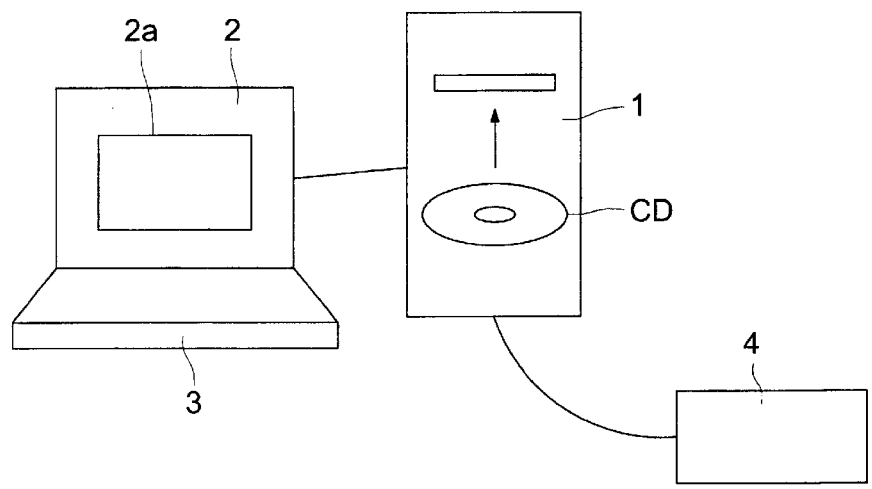
FIG. 1 is a diagram showing an image processing apparatus including a data retrieval apparatus in the present embodiment.

An embodiment of the invention will be explained as follows, referring to the drawings.

FIG. 1 is a diagram showing an image processing apparatus in the present embodiment. An image processing apparatus that is preferably installed in a residence or a photofinishing laboratory is equipped with main body 1 provided with a storage unit having large capacity, display unit 2 representing a display, inputting unit 3 representing a key board and scanner 4 capable of reading images. For example, when storage medium CD storing therein a program for executing an image data storage method and an image processing method is inserted into reading section 1a of main body 1, the program is read out on the memory of main body 1 to be executed.

A vast amount of image data can be turned into data to be stored in main body 1. In this case, by adding additional information as a content feature (data used for retrieval, and a date for an image is a content feature in this case) correlating with image data, it is possible to detect specific image data based on the additional information even when a title of the image data is not known. For example, if the moment of photographing is remembered even roughly, image data can be detected based on the rough remembrance. Incidentally, for executing this image retrieval, the content feature needs to be stored in advance, correlating with image data. In the case of a silver halide negative film, however, information of the date of photographing is not recorded originally as digital data in many cases. So, if an operator reads the date of the image and inputs it manually each time in the case of inputting image data, it is time-consuming. In the present embodiment, therefore, the image data are stored together with additional information in the following manner.

Figure 2:
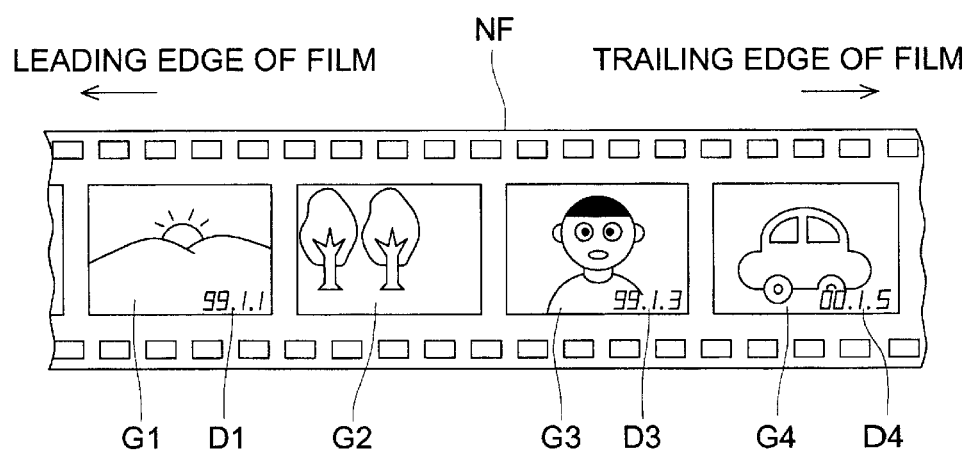
FIG. 2 is a diagram showing a silver halide negative film wherein images are formed through photographing.

FIG. 2 is a diagram showing a silver halide negative film wherein images are formed through photographing. In FIG. 2, a left side of the silver halide negative film is a leading edge, while, a right side thereof is a trailing edge. Therefore, image G1 is older than image G4 in terms of the photographing date. With regard to image G1, photographing date D1 (Jan. 1, 1999) is printed at the lower portion on the right side by the use of the dating function of a camera of a silver halide type.

Figure 4:
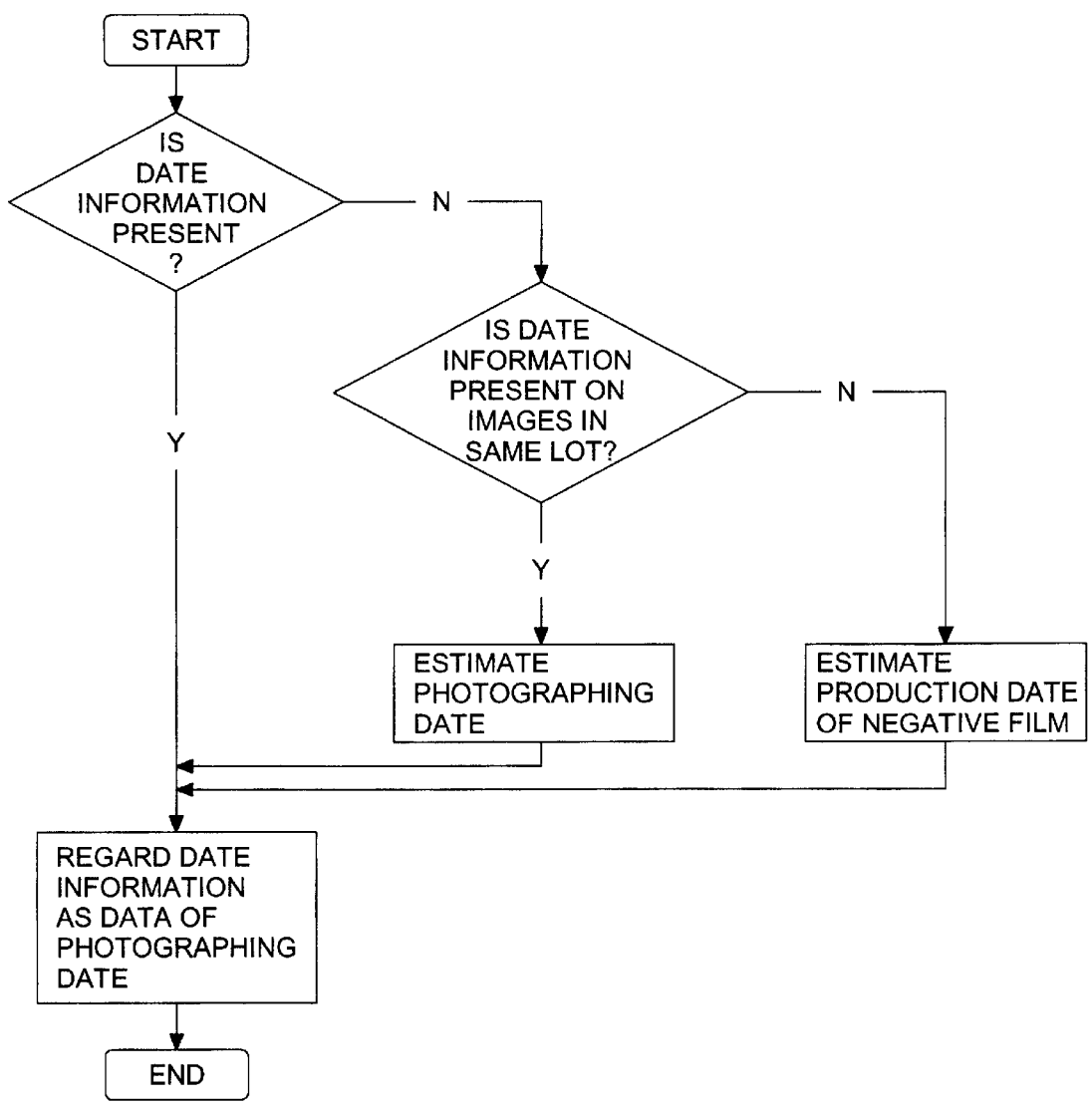
FIG. 4 is a flow chart showing rough procedures to estimate the photographing date for the image and to store it as the content feature.

In FIG. 4, there are shown rough procedures to estimate the photographing date for the image and to store it as the content feature. First, detection is conducted to find whether or not the photographing date is printed by the dating function of the camera on the prescribed image formed on a silver halide film. When the photographing date is printed in this case, the photographing date is processed as the content feature of the image data. On the other hand, when the photographing date is not printed, discrimination is conducted to find whether or not the photographing date is printed on the other image in the same lot. Then, when the photographing date is printed on the other image, a photographing date of a prescribed image is estimated based on the photographing date stated above. When the photographing date is not printed on the other image either, a production date of the silver halide negative film is estimated by another way. Then, the photographing date estimated through the methods stated above is recognized as a photographing date of the prescribed image, and is processed as the content feature. Details for each case will be described later.

Figure 5:
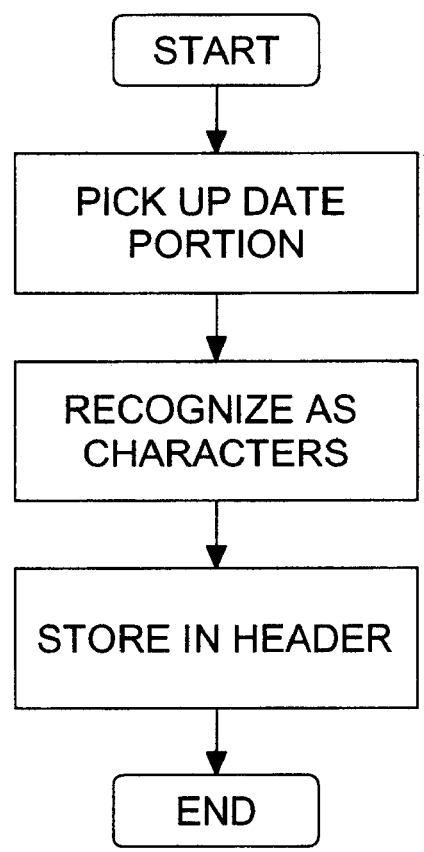
FIG. 5 is a flow chart showing concrete procedures to convert date into text data, and stores it as the content feature showing the preparation date on which the image data are prepared.

When digitizing (converting into image data) image G1 on silver halide negative film NF by the use of scanner 4 in FIG. 1, main body 1 reads date D1 positioned at the lower portion on the right side of image G1 by using OCR function for the image data obtained, to convert it into text data, and stores it, correlating with image data, as the content feature showing the preparation date on which the image data are prepared. Concrete procedures are as follows. FIG. 5 shows the procedures.

(1). A date portion is picked up from the background of the portion where the date is printed. As a picking up method, the method described in Japanese TOKKAI-SHO 2001-43360, for example, is used.

(2). In (1) above, an image is binary-coded so that the background portion takes 0 and the date portion takes 1.

(3). There are prepared, in advance, binary-coded image data wherein a character portion takes 1 and a background portion takes 0 for character patterns of "0" through "9" and ".", and pattern matching is conducted for each one character of (2) to obtain the closest character.

(4). What is obtained is stored as Exif file representing one of the image file formats, and the date information obtained in (3) is recorded on its header portion. The content feature stored in the header of the image data makes image retrieval to be easy.

When the image data are stored in the database of main body 1, even when the title name of the image data is not remembered, an image can be detected easily from the photographing date representing the content feature, if the image is known to have been photographed, for example— on New Year's Day in 1999, which is an advantage.

With regard to image G2 on silver halide film NF, the photographing date is not printed because the dating function was canceled for photographing, and from this image, the date representing the content feature correlated with image data cannot be stored. However, the date can be estimated from images other than the image G2.

To be more concrete, when photographing date D1 of image G1 photographed prior to image G2 is known, and if photographing date D3 (Jan. 3, 1999) of image G3 photographed after image G2 is known, the photographing date of the image G2 is estimated to be between photographing date D1 and photographing date D3. When digitizing image G2 by the use of scanner 4, main body 1 can read date D3 for image G3 wherein the date is printed and then, can store the date (Jan. 2, 1999) that is after the photographing date D1 and is before the photographing date D3, or the period (Jan. 1–Jan. 3, 1999) as the content feature, correlating with image data of image G2. Incidentally, if the date D3 of image G3 is Jan. 1, 1999, for example, and agrees with date D1 of image G1, the date of image G2 can also be estimated to be Jan. 1, 1999.

Incidentally, when only images wherein dates are not printed or images wherein dates are hardly recognized are present in silver halide film NF, it is possible to estimate the photographing date or a period based on symbols or marks such as bar codes and production dates described on a cartridge of a silver halide negative film, and thereby to store the estimated photographing date or the period as the content feature, for image data correlating with the images wherein dates are not printed or images wherein dates are hardly recognized.

Figure 6:
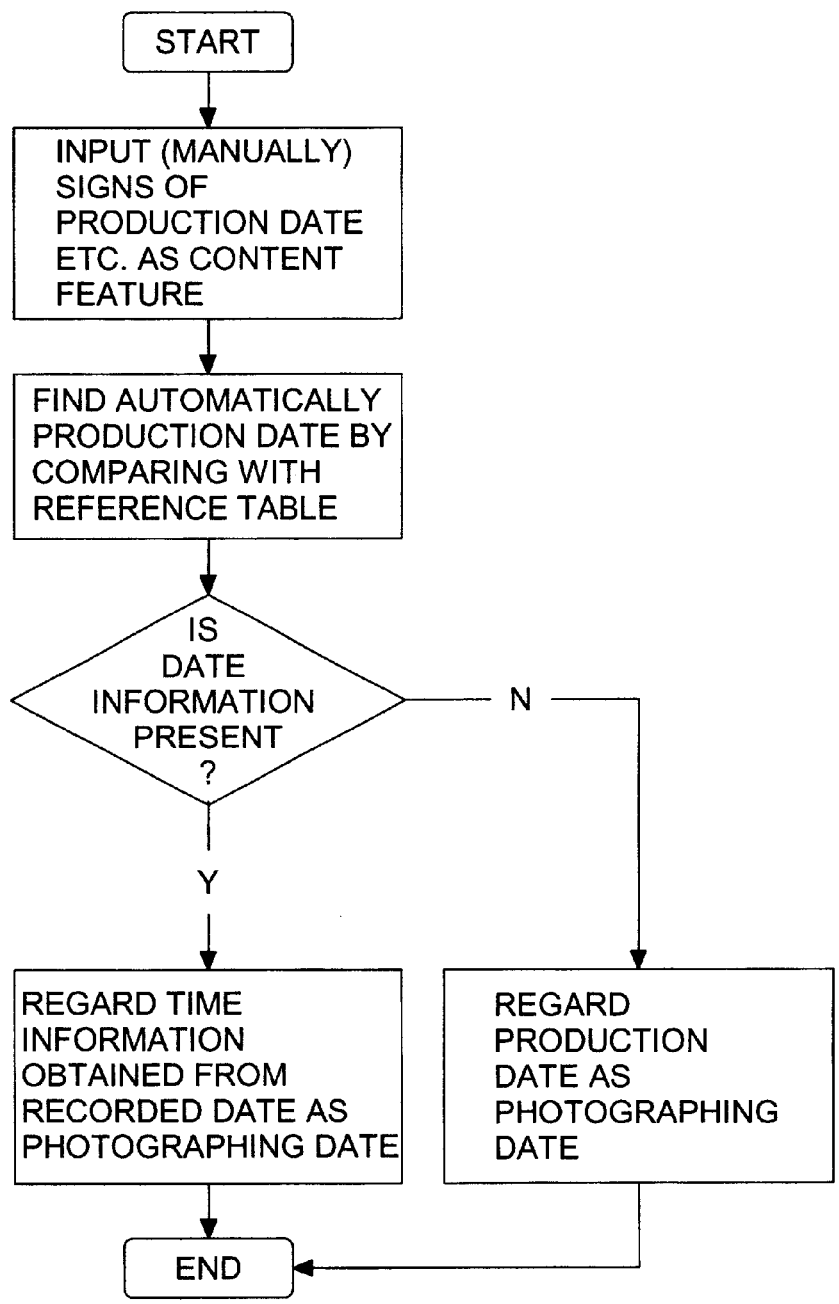
FIG. 6 is a flow chart showing concrete procedures to store the estimated photographing date or the period as the content feature.

Concrete procedures are as follows. The procedures are shown in FIG. 6.

(1). Data obtained when bar codes printed on a cartridge of a silver halide negative film are read by a bar code reader and symbols or marks such as a production date are stored to be correlated with image data by an operator as the content feature, when digitizing a negative film.

(2). Bar code data, symbols or marks such as a production date and a table that is for correlation with a production date are stored in advance, and the production date of a negative film is obtained from the table automatically.

(3). In the case of retrieval, when date information printed by date function is present, that information has priority, and when the date information is not present, namely, when photographing was conducted by canceling the dating function totally for one lot, the production date for the negative film obtained in (2) is stored as the production date.

Incidentally, image G1 in negative film NF is older than image G4 by about one year in terms of photographing time. Therefore, color fading caused by an environmental influence is considered to be more for the image G1. In this situation, the image processing method of the present embodiment makes it possible to correct color fading by conducting image processing when digitizing image G1. Images before and after the correction can be displayed on display unit 2 (FIG. 1) for confirmation.

To be more concrete, when image G1 is converted into image data by scanner 4, it is conceivable that an image can be modulated more by conducting tone characteristic conversion processing for the image data. The extent of conversion of tone characteristics is determined, corresponding to date D1 obtained through simultaneous reading, and it is an amount corresponding to the period from Jan. 1, 1999 to the present time, for image G1.

Incidentally, it is conceivable that the statistics of tone characteristics of the image are collected in accordance with the photographing date, and tone characteristic conversion processing is conducted based on the characteristics. For example, if an extent of color fading for the storage period is obtained statistically, the correction corresponding to the extent of color fading can be conducted, which is preferable. To be more concrete, it is preferable that the tone characteristic conversion processing is conducted based on at least one of histogram, cumulative histogram, the mean value, median, a mode, the standard deviation and dispersion, all of the image tone characteristics.

Concrete procedures are as follows.

(1). A histogram of tone characteristics is prepared for a plurality of images (one image, when images whose photographing dates are the same or close each other are not present) whose photographing dates are the same or close each other. In this case, the histogram of tone characteristics represents frequency of values taken by each of RGB for all pixels in the images when the image is composed of 8-bit pixels for each of RGB. For example, for the image composed of pixels in quantity of 600×480=288000, there is obtained frequency wherein the number of pixels in which R is 0–16 is 100, the number of pixels in which R is 17–33 is 210 . . . , the number of pixels in which G is 0–16 is 150 . . . , and the number of pixels in which B is 0–16 is 400 . . . . In general, the frequency for an area that is in neutral (128) is highest for each of RGB.

(2). For example, when a color of an image is changed to be sepia-like by color fading of a negative film, an area where red is slightly stronger than neutral shows the highest frequency, with regard to the histogram of R. In this case, the number of pixels for R for all pixels needs to be lowered so that an area of neutral may show the highest frequency.

(3). Further, a mean value of the number of pixels for each of RGB, or a median value or mode (a value of the highest frequency) thereof may be used in place of the area having the highest appearance frequency in the histogram. In addition, the standard deviation and the dispersion value may be adjusted so that distribution of the histogram may be equal on the whole.

Further, if the tone characteristic conversion processing is conducted for images stored in the same file such as an electronic album, so that the tone characteristic may be constant, when the images are arranged in the order of photographing, the tone is not changed extremely, and a feeling of physical disorder is not given to an observer.

Though the examples stated above are for the occasion of a silver halide negative film, with regard to an image converted into image data directly by an electronic camera in contrast with the foregoing, the initial image quality is maintained independently of the storage period.

In the image processing method of the present embodiment, when image data are inputted from an electronic image recording apparatus such as an electronic camera, information about the date (for example, a photographing date) added to the image data is read, and the image data are subjected to image processing to be correlated with the photographing date, so that the effect stated above is obtained. Namely, with regard to the image for which the date of photographing is old, the number of pixels for R, for example, is enhanced in accordance with the time elapsed up to the present time, and image processing is conducted so that sepia color tone may be obtained, thus, it is possible to express natural color fading like that of a silver halide photograph.

To be concrete, a value of R in RGB is converted by the following expression (1) when X years, for example, represents the time elapsed up to the present time (A is a constant, and its preferable value is about 10).

$$R \times (1 + X/A) \qquad (1)$$

Further, if the image processing stated above is the tone characteristic conversion processing corresponding to the photographing date, it is possible to give image change corresponding to the time elapsed, and thereby to express feeling that is more natural.

If the statistics of the change in tone characteristics of an image of a silver halide film for the time elapsed are collected to prepare the results of the statistics, and if the tone characteristic conversion processing is conducted based on the aforesaid statistics, it is possible to obtain statistically the extent of color fading of a silver halide photograph for the period during which the photograph was preserved.

Furthermore, it is preferable that the tone characteristic conversion processing is conducted based on at least one of histogram, cumulative histogram, the mean value, median, a mode, the standard deviation and dispersion, which are all image tone characteristics.

If the tone characteristic conversion processing is conducted for images stored in the same file as in an electronic album, so that the tone characteristic may vary in accordance with the date of photographing, it is possible to obtain the image which seems as if it were faded in accordance with the time elapsed, resulting in an album that is close to one for silver halide photographs, which is preferable.

Figure 7:
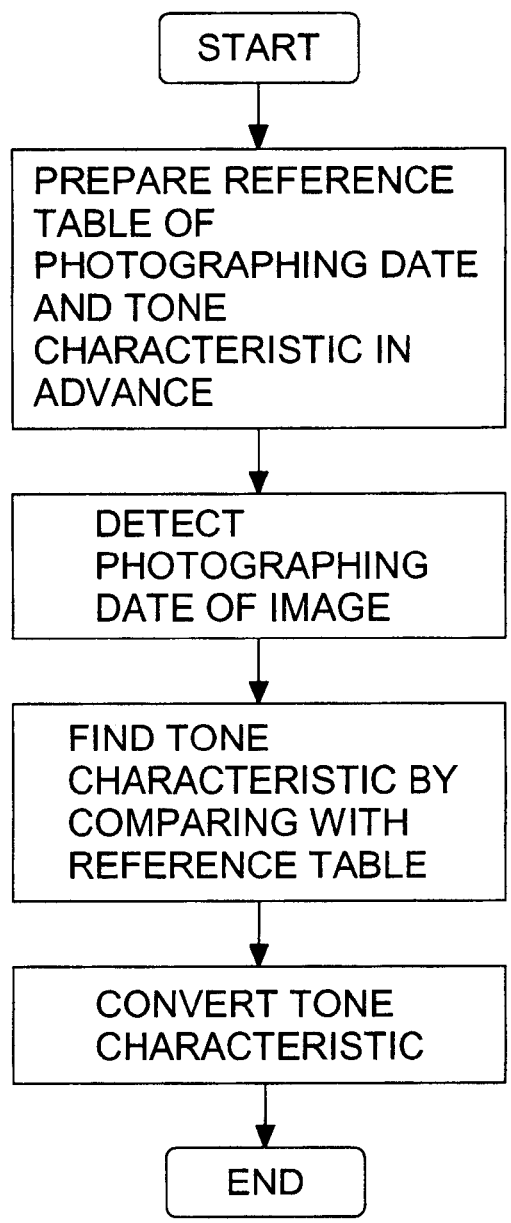
FIG. 7 is a flow chart showing concrete procedures to conduct the tone characteristic conversion processing.

To be concrete, the tone characteristic conversion processing is conducted in the following procedures which are shown in FIG. 7.

(1). Negative films in the same year of photographing or prints are digitized by a scanner to prepare the histogram of tone characteristics in the same manner as in the foregoing, and the number of pixels having the highest appearance frequency or a range of the number of pixels is obtained for each of RGB. An example wherein prints are digitized will be explained here.

(2). Procedures in (1) are repeated, and thereby a table such as the following table on which the year of photographing is collated with the number of pixels having the highest appearance frequency for RGB or a range of the number of pixels (hereinafter referred to as RGB highest frequency value) is prepared in advance, to be recorded on the recording medium on which an application is recorded.

TABLE

| Year | R | G | B |
|------|-----|-----|-----|
| 1900 | 135 | 128 | 127 |
| 1901 | 135 | 127 | 127 |
| . | . | . | . |
| 2000 | 128 | 128 | 128 |

(3). Let it be assumed that the images photographed by an electronic image recording apparatus such as an electronic camera are those photographed in 1980, for example, and the highest frequency value for RGB is represented by R=130, G=128 and B=128. In this case, an amount of change for RGB is calculated as follows by a difference between the highest frequency value for RGB and the number of neutral pixels 128.

$Rmove=130-128=2$ $Gmove=128-128=0$ $Bmove=128-128=0$

As a result, the number of pixels for R of images photographed in 1980 is converted in the form where 2 is added.

Incidentally, since the date recorded on a film by an automatic dating function of a camera of a silver halide type is multi-exposure-recorded on a photographed image recorded through exposure, when a photographed image on a date recording area is bright, in particular, the date sometimes fails to be recognized correctly because the date is close to the bright image in terms of luminosity. In this case, the following method is effective.

Figure 3:
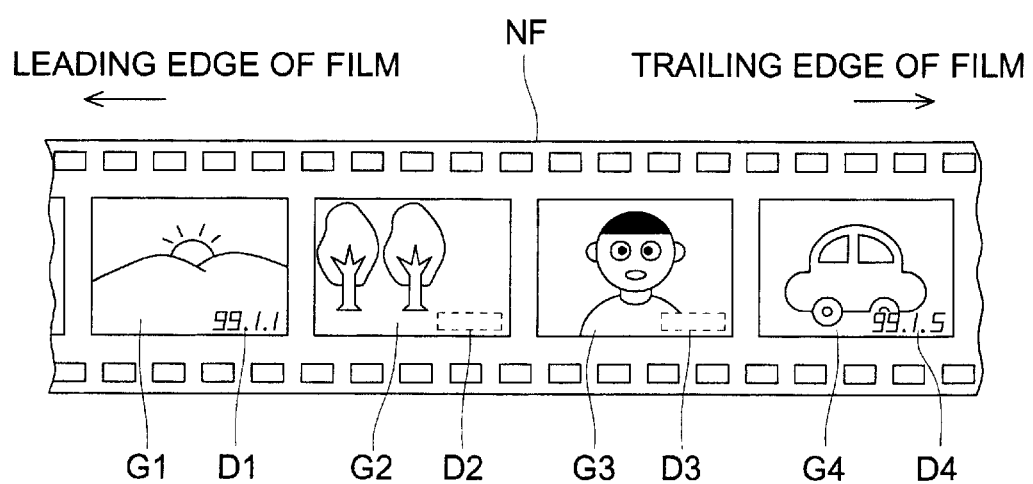
FIG. 3 is a diagram showing a silver halide negative film that is the same as one shown in FIG. 2.

FIG. 3 is a diagram showing a silver halide negative film that is the same as one shown in FIG. 2. In FIG. 3, date D1 and date D4 which can be read distinctly are printed respectively on image G1 and image G4, but with regard to image G2 and image G3 which are captured between image G1 and image G4 on the film, date D2 and date D3 printed respectively on image G2 and G3 are affected by subjects so that they cannot be read distinctly.

Now, consecutive image G2 and image G3 are digitized to be converted into image data, and then, pixel data (numerical values corresponding to image luminance, image brightness or image density) of pixels corresponding respectively to both images are subjected to addition processing. In this case, the results of the addition processing for the pixel data are averaged to create images which are totally gray, for example, because two images G2 and G3 are different from each other. However, when date D2 and date D3 which are respectively for two images G2 and G3 are the same, the results of addition processing for pixel data corresponding to date information are not averaged, and a clear image can be obtained. Therefore, when the date of the composite image obtained through addition processing has been recognized, it is possible to judge that image G2 and image G3 were captured on the same day. Incidentally, it is naturally possible to conduct addition processing not for two images but for three images or more. Further, it is also possible to conduct multiplication processing in place of addition processing (The same shall apply hereinafter).

Further, for educing the photographing dates for image G2 and image G3, image G1 is digitized to be converted into image data, and then, pixel data (numerical values corresponding to image luminance, image brightness or image density) of image G2 are subjected to addition processing as stated above. When the date of the composite image obtained through the addition processing can be recognized as distinctly as the date of image G1, it is possible to judge that image G1 and image G2 were captured on the same day, and thereby to use date D1 (Jan. 1, 1999) for image G1 as date D2 for image G2 and date D3 for image G3.

In FIG. 3, on the other hand, when a date cannot be read distinctly, after consecutive image G2 and image G3 are digitized to be converted into image data, and then, pixel data (numerical values corresponding to image luminance, image brightness or image density) of pixels corresponding respectively to both images are subjected to addition processing, there is a possibility that image G2 and image G3 were not captured on the same day. In this case, with regard to the date of image G2, image G1 that precedes image G2 is digitized to be converted into image data, and then, pixel data (numerical values corresponding to image luminance, image brightness or image density) of image G2 are subjected to addition processing as stated above. When the date of the composite image obtained through the addition processing can be recognized as distinctly as the date of image G1, it is possible to judge that image G1 and image G2 were captured on the same day, and thereby to use date D1 (Jan. 1, 1999) for image G1 as date D2 for image G2.

In contrast to the foregoing, with regard to the date of image G3, image G4 succeeding the image G3 is digitized to be converted into image data, and then, pixel data (numerical values corresponding to image luminance, image brightness or image density) of image G3 are subjected to addition processing as stated above. When the date of the composite image obtained through the addition processing can be recognized as distinctly as the date of image G4, it is possible to judge that image G3 and image G4 were captured on the same day, and thereby to use date D4 (Jan. 5, 1999) for image G4 as date D3 for image G3.

In addition to the foregoing, it is conceivable, for deducing the date, that pixel data for image G1 and image G3, for example, are subjected to addition processing, or pixel data for image G2 and image G4 are subjected to addition processing.

Though the invention has been explained above making reference to the embodiment, the invention is not limited to the embodiment, and it is naturally possible to modify and improve according to circumstances.

The invention makes it possible to provide an image data storage method capable of inputting date information correlating with image data, and to provide an image processing method wherein color fading of a silver halide film can be corrected appropriately, and processing of a natural effect that is just like a silver halide photograph can be applied on images formed from image data.

What is claimed is:

1. An image data preservation method comprising the steps of:

converting an image on a same silver halide film or a print thereof in which at least one item of information about a date is photographed by the use of a date function of a camera, into image data;

reading the information about the date on the image when the image is converted into the image data; and preserving the read information of a date to be correlated with the image data, as additional information of the image, wherein when the same silver halide film or the print thereof includes, mixedly, an image wherein a date is not photographed or an image wherein a date is hardly recognized, and an image wherein a date is photographed, the date of the image wherein the date is photographed can be preserved as additional information for the image data corresponding to the image wherein the date is not photographed or the image wherein the date is hardly recognized.

2. An image data preservation method comprising the steps of:

converting an image on a same silver halide film or a print thereof in which at least one item of information about a date is photographed by the use of a date function of a camera, into image data;

reading the information about the date on the image when the image is converted into the image data; and preserving the read information of a date to be correlated with the data, as additional information of the image, wherein when images on the same silver halide film of the print thereof in which the same date is photographed are present before and after an image wherein a date is not photographed or an image wherein a date is hardly recognized, the date of the images wherein the same date is photographed can be preserved as additional information for the image data corresponding to the image wherein the date is not photographed or the image wherein the date is hardly recognized.

3. An image data preservation method comprising the steps of:

converting an image on a same silver halide film or a print thereof in which at least one item of information about a date is photographed by the use of a date function of a camera, into image data;

reading the information about the date on the image when the image is converted into the image data; and preserving the read information of a date to be correlated with the image data, as additional information of the image, wherein when images on the same silver halide film of the print thereof in which dates different from each other are photographed are present before and after an image wherein a date is not photographed or before and image wherein a date is hardly recognized, a date or a period of time between the dates for the images in which the dates different from each other are photographed can be preserved as additional information for the image data corresponding to the image wherein the date is not photographed or the image wherein the date is hardly recognized.

4. An image data preservation method comprising the steps of:

converting an image on a same silver halide film or a print thereof in which at least one item of information about a date is photographed by the use of a date function of a camera, into image data;

reading the information about the date on the image when the image is converted into the image data; and preserving the read information of a date to be correlated with the image data, as additional information of the image, wherein when an image on the same silver halide film of the print thereof in which a date is photographed is present before an image wherein a date is not photographed or an image wherein a date is hardly recognized, a date after the date of the image wherein the date is photographed can be preserved as additional information for the image data corresponding to the image wherein the date is not photographed or the image wherein the date is hardly recognized.

5. An image data preservation method comprising the steps of:

converting an image on a same silver halide film or a print thereof in which at least one item of information about a date is photographed by the use of a date function of a camera, into image data;

reading the information about the date on the image when the image is converted into the image data; and preserving the read information of a date to be correlated with the image data, as additional information of the image, wherein when an image on the same silver halide film of the print thereof in which a date is photographed is present after an image wherein a date is not photographed or an image wherein a date is hardly recognized, a date before the date of the image wherein the date is photographed can be preserved as additional information for the image data corresponding to the image wherein the date is not photographed or the image wherein the date is hardly recognized.

6. An image data preservation method comprising the steps of:

converting an image on a same silver halide film or a print thereof in which at least one item of information about a date is photographed by the use of a date function of a camera, into image data;

reading the information about the date on the image when the image is converted into the image data; and preserving the read information of a date to be correlated with the image data, as additional information of the image, wherein when an image on the same silver halide film of the print thereof wherein a date photographed therein is hardly recognized is present the date photographed is extracted by processing the image and an image photographed before or after the image wherein a date photographed therein is hardly recognized, and the extracted date can be preserved as additional information, for image data corresponding to the image wherein the date photographed therein is hardly recognized.

* * * * *